United States Patent [19]

Hawrylo et al.

[11] 4,306,355
[45] Dec. 22, 1981

[54] METHOD AND APPARATUS FOR AUTOMATICALLY INSTALLING COVERS ON LEAD-ACID BATTERY CELLS

[75] Inventors: Stanley Hawrylo, Whitehall; Edward O. Neukirch, Reading, both of Pa.

[73] Assignee: General Battery Corporation, Reading, Pa.

[21] Appl. No.: 77,670

[22] Filed: Sep. 21, 1979

[51] Int. Cl.³ .................. B23P 19/04; H01M 2/02
[52] U.S. Cl. ......................... 29/623.2; 29/623.1; 29/730; 29/731
[58] Field of Search .................. 29/730, 731, 623.2, 29/623.1; 198/339, 341

[56] References Cited

U.S. PATENT DOCUMENTS

| | | | |
|---|---|---|---|
| 61,145 | 1/1867 | Beu | 414/126 |
| 2,659,522 | 11/1953 | Ninneman et al. | 414/125 |
| 2,680,510 | 6/1954 | Donath | 414/126 |
| 2,692,691 | 10/1954 | Harriss et al. | 414/129 |
| 3,109,921 | 11/1963 | Anderson | 219/125 |
| 3,114,032 | 12/1963 | Leader et al. | 219/125.1 |
| 3,220,885 | 11/1965 | Udell et al. | 29/730 |
| 3,270,116 | 8/1966 | Ruekberg | 425/806 |
| 3,319,498 | 5/1967 | Wolford | 264/161 X |
| 3,395,912 | 8/1968 | Tappolet et al. | 271/16 |
| 3,427,424 | 2/1969 | Kirchberger et al. | |
| 3,475,243 | 10/1969 | Scalora | 156/380 |
| 3,493,035 | 2/1970 | Tiegel et al. | 228/58 |
| 3,648,015 | 3/1972 | Fairbairn | 219/121 ET |
| 3,664,016 | 5/1972 | Sevc et al. | 140/147 |
| 3,674,085 | 7/1972 | Clingenpeel et al. | 29/730 |
| 3,700,011 | 10/1972 | Walter | 140/147 |
| 3,742,987 | 7/1973 | Tarbox | 140/147 |
| 3,779,291 | 12/1973 | Yeo | 140/147 |
| 3,883,369 | 5/1975 | Badger et al. | 29/623.1 |
| 3,895,477 | 7/1975 | Yamashita | 414/126 |
| 3,895,574 | 7/1975 | Nyborg | 414/125 |
| 3,903,937 | 9/1975 | Drummond | 140/147 |
| 3,909,300 | 9/1975 | Schenk, Jr. et al. | 29/623.1 |
| 3,909,301 | 9/1975 | Schenk, Jr. | 29/730 |
| 3,934,782 | 1/1976 | Cushman et al. | 164/DIG. 1 |
| 3,938,368 | 2/1976 | Eberle | 73/45.1 |
| 3,986,247 | 10/1976 | Kellner et al. | 29/430 |
| 4,001,066 | 1/1977 | Channing et al. | 156/152 |
| 4,002,191 | 1/1977 | Lorenzini | 140/147 |
| 4,013,864 | 3/1977 | Tiegel et al. | 29/730 |
| 4,025,371 | 5/1977 | Pecha | 29/623.2 |
| 4,050,501 | 9/1977 | Eberle | 164/DIG. 1 |
| 4,074,423 | 2/1978 | DiGiacomo et al. | 29/730 |
| 4,102,638 | 7/1978 | Teigel | 164/DIG. 1 |
| 4,164,310 | 8/1979 | DiGiacomo et al. | 228/58 |

*Primary Examiner*—Daniel C. Crane
*Attorney, Agent, or Firm*—Benasutti Associates, Ltd.

[57] ABSTRACT

A method for automatically installing covers on industrial lead-acid battery cells including the steps of placing cell groups within a cell jar, then automatically straightening the posts of the group. The cover is then placed on the jar containing the group, the cover is sealed to the jar, and the excess flash, which may have been produced during the cover sealing operation, is removed. Next, the posts are welded to bushings mounted in the cover. The sealed cell is then tested to insure that no leaks are present. Those cells passing the seal test will be passed on for further assembly operations while those cells which do not pass the seal test will be automatically shunted aside for subsequent manual inspection and rework where possible. The apparatus comprises a series of interlocked and interrelated conveyors, accumulators and pinchstop mechanisms which automatically convey the cells being sealed to machines which perform the operations delineated in the aforementioned method in the proper sequence.

18 Claims, 1 Drawing Figure

METHOD AND APPARATUS FOR AUTOMATICALLY INSTALLING COVERS ON LEAD-ACID BATTERY CELLS

BACKGROUND OF THE INVENTION

The present invention relates to production of lead-acid batteries and more particularily to a method and apparatus for automatically installing a cover on a container, or jar, containing a group comprising elements of a cell of an industrial lead-acid battery.

In the past, the covers have been installed on the jars manually, a procedure which is time consuming, mistake prone and which has become increasingly expensive. A typical manual operation involves straightening the terminal posts of the group contained within the jar by banging them with a mallet. This procedure was performed to more or less insure that each terminal post would slide through its respective bushing which had been previously molded into the cover.

The cover was then placed over the terminal posts and forced into the top of the jar again using a mallet. This operation was especially time consuming and mistake prone since different portions of the cover had to be struck by the mallet to ensure that the cover was installed with its top surface substantially level with respect to the top of the jar and at a predetermined height thereabove.

This was followed by pouring an asphalt like compound into a grove formed around the perimeter of the cover, the grove being formed by the contour of the cover in conjunction with the inner top surfaces of the jar. Once the compound substantially cooled and hardened, the terminal posts were then welded to the bushings by using a hand torch. This is another operation, the quality of which depends greatly on the skill of the person performing the function. Upon completion of the terminal post welding operation, the jars were sent off for further assembly operations. As a result, defects in the industrial battery cell resulting from the cover sealing operation were not discovered until much later in the assembly cycle and possibly not until the battery was delivered and in use.

SUMMARY OF THE INVENTION

The present invention provides a method and means for automatically installing a cover on an industrial lead-acid battery container having a group disposed therein. These accomplishments result from the numerous features incorporated in applicants novel system.

One such feature is a novel conveying means for automatically transporting the battery cells from one station to another in the proper sequence. These stations include an automatic post straightener, an automatic cover placement apparatus, an automatic cover container sealing apparatus, an automatic flash remover, an automatic post welder and an automatic cell tester.

Another feature includes means for sensing cells at the individual stations and thereupon positioning the cell and holding it until that particular operation is completed.

Yet another feature is accumulator means for accumulating cells after one operation has been completed and before the next operation is to begin whereupon the subsequent operation can be performed sequentially as the batteries complete the preceeding operation.

A further feature is automatic reject selection means whereby those cells having a defective cover to container seal are automatically culled out of the main assembly line.

Accordingly, a primary object of the present invention is the provision of a method and apparatus for automatically sealing a cover and container of an industrial lead-acid battery.

Another object of the present invention is the provision of a method and apparatus whereby industrial lead-acid battery cells having defective cover to container seals, can be automatically detected and separated from good cells.

An additional object of the present invention is the provision of conveyancing means for automatically transporting industrial lead-acid battery cells in a sequential manner from station to station as well as positioning and maintaining the cell within each station until that particular operation has been completed.

A further object is to provide means for detecting malfunctions or slowdowns at each individual station and interlocking the conveyancing means with previous stations whereby overloading of any particular station is eliminated.

These and other objects of the present invention will become apparent from the following more detailed description.

DETAILED DESCRIPTION OF THE DRAWING

Figure 1:
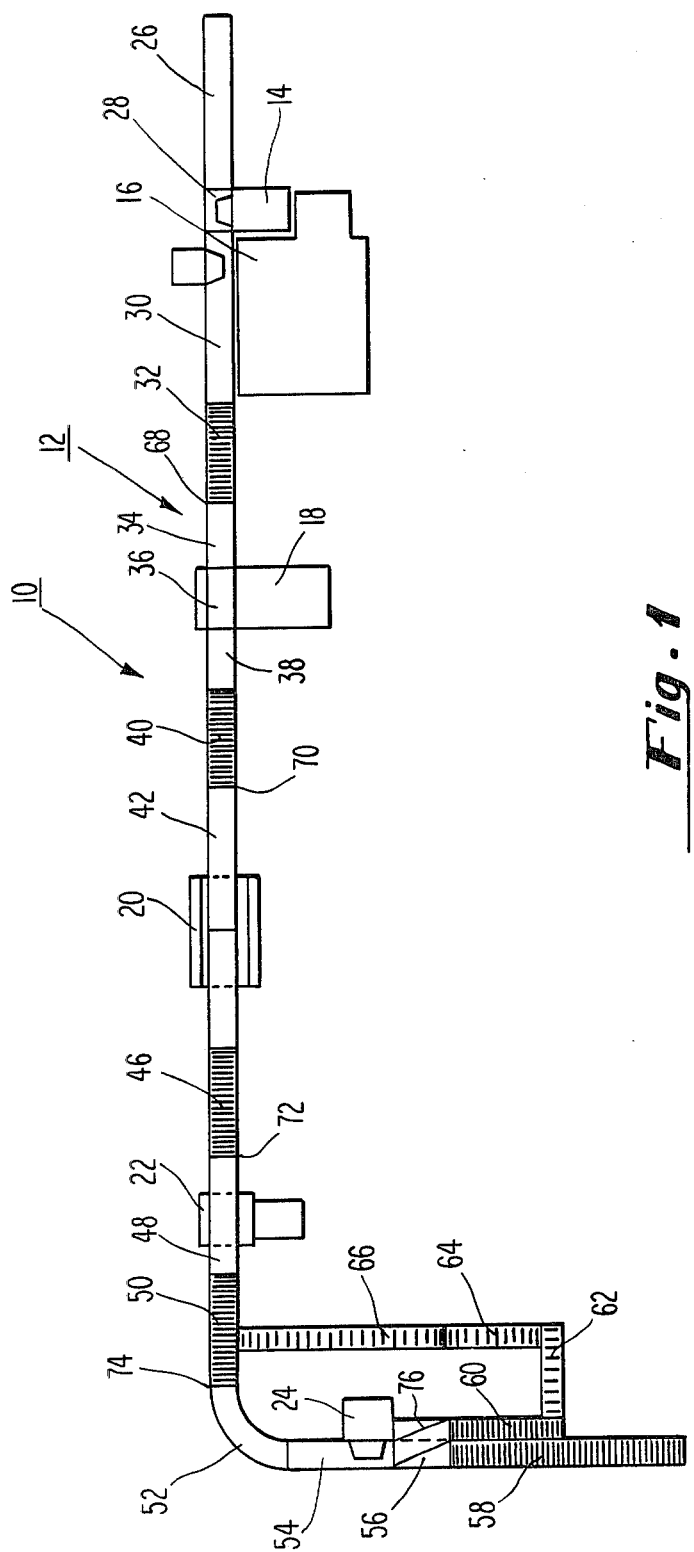
FIG. 1 is a schematic representation of the system of the present invention showing conveyancing means and the sequential relationship between individual operating stations.

In accordance with the present invention, a lead-acid battery cell cover is automatically sealed to a cell container, having a cell group disposed therein, by the steps of: straightening terminal posts of the cell group; placing the cover on the container, and positioning the terminal posts of the cell group through bushings predisposed in the cover; heat sealing the cover to the container; removing any flash which may have accumulated at the cover to container seal; welding the terminal posts to the bushings disposed therearound; testing the cells for leaks at the cover to container seal and the terminal posts to bushings weld; and automatically culling out those cells which fail the test.

The method of the present invention is accomplished by the apparatus which is schematically shown in FIG. 1. The automated system for sealing the covers to the containers is designated generally 10. The 10 comprises conveyor means, generally designated 12 for automatically transporting the lead-acid battery cells to and from various operating stations in a predetermined sequence. The various operating stations include a post straightening apparatus 14, a cover placement apparatus 16, a heat sealing apparatus 18, a flash removing apparatus 20, a post welding apparatus 22, and a cell test apparatus 24.

A detailed description of the post straightening apparatus 14 is contained in co-pending U.S. application entitled "Automatic Post Straightening Apparatus and Method", Ser. No. 77,677, filed Sept. 21, 1979, which application is incorporated herein by reference as if fully set forth herein. A detailed description of the cover placement apparatus 16 is contained in co-pending U.S. Patent application entitled "Automatic Cover Placement Apparatus", Ser. No. 42,281, filed May 25, 1979, now abandoned which application is incorporated herein by reference as if fully set forth herein. A detailed description of the flash removing apparatus 20 is contained in co-pending U.S. Patent application entitled, "Automatic Flash Removing Apparatus and Method", Ser. No. 77,669, filed Sept. 21, 1979, which application is incorporated herein by reference as if fully set forth herein. A detailed description of the post welding apparatus 22 is contained in co-pending U.S. Patent application entitled "Automatic Post Weld Apparatus", Ser. No. 77,668, filed Sept. 21, 1979, which application is incorporated herein by reference as if fully set forth herein. The cell test apparatus 24 is substantially the same as that described in U.S. Pat. No. 3,938,368, the specification of which is incorporated herein by reference as if fully set forth herein, except that the cell test apparatus 24 of the present invention utilizes a single nozzle assembly to matingly engage a single fill hole in the cell under test instead of 6 nozzle assemblies used to matingly engage 6 fill holes as disclosed in the referenced patent. The heat sealing apparatus 18, is similar to that disclosed in U.S. Pat. No. 4,001,066, the specification of which is incorporated herein by reference as if fully set forth herein.

The conveyor means 12 comprises a first belt conveyor 26, a second belt conveyor 28, a third belt conveyor 30, a first roller accumulator 32, first, second and third roller conveyors 34, 36, and 38 respectively, second roller accumulator 40, a fourth belt conveyor 42, a fifth belt conveyor 44, a third roller accumulator 46, a sixth belt conveyor 48, a fourth roller accumulator 50, a 90° turn belt conveyor 52, a seventh belt conveyor 54, a wide belt conveyor 56, an acceptance roller accumulator 58, a reject roller accumulator 60 and first, second and third recycle roller conveyors 62, 64 and 66 respectively.

A first pinchstop apparatus 68 is located at one end of the first roller accumulator 32. A second pinchstop apparatus 70 is located at one end of the second roller accumulator 40. A third pinchstop apparatus 72 is located at one end of the third roller accumulator 46. A fourth pinchstop apparatus 74 is located at one end of the fourth roller accumulator 50.

The operation of the automated system 10 is as follows. After a lead-acid battery cell group has been placed in a container, the container with the group disposed therein is placed on the first belt conveyor 26. The first belt conveyor 26 moves the container to the second belt conveyor 28. The second belt conveyor 28 then moves the container into position at the post straightening apparatus 14. When the cell is in position, it is sensed by a sensor, for example an electric or pneumatic sensor, which signals the post straightening apparatus 14 that a cell is in place and that the machine is to start its operational cycle.

Upon receipt of the signal from the sensor, the second belt conveyor 28 will stop and a guide clamp, for example a pneumatic type, will energize and hold the cell in proper position in the post straightening apparatus 14. After a predetermined delay, for example three seconds in the preferred embodiment, to ensure that proper clamp has been effected, a signal will be given the post straightening apparatus 14 which enables a ram to drop onto the cell posts. A limit switch, for example pneumatic or electric, mounted on the ramhead, strikes the top edge of the cell and is activated. When the limit switch is activated, it causes the ram to return to its home position.

After a predetermined delay, for example five seconds in the preferred embodiment from the time the sensor signals the post straightening apparatus 14, the guide clamp will release, the second belt conveyor 28 will restart and the cell will move out of the post straightening apparatus 14 toward the third belt conveyor 30. This cycle will repeat itself for each cell. The first belt conveyor 26 operates either manually under the control of an operator who loads the containers onto the conveyor, or will automatically index on demand of the second belt conveyor 28, and stop thereafter when a new cell is in position as sensed by a sensor located between the first and second belt conveyors 26 and 28.

The third belt conveyor 30 receives the cell from the second belt conveyor 28 and transports the cell into position at the cover placement apparatus 16. When the cell is in position at the cover placement apparatus 16, a sensor, for example either electric or pneumatic, signals the cover placement apparatus 16 that a cell is in place. Upon receipt of the signal from the sensor the third belt conveyor 30 stops and, a guide clamp, for example a pneumatic type in the preferred embodiment, energizes and holds the cell in position under a set of drop cams of the cover placement apparatus 16. After a predetermined delay, approximately three seconds in the preferred embodiment in order to assure proper clamping, the drop cams are energized allowing one cover to drop on the cell. After a predetermined time delay, approximately three seconds in the preferred embodiment, the cams will return to their home position to accept the next cover whereupon the guide clamp releases, the third belt conveyor 30 restarts and the cell is moved toward the first roller accumulator 32. The cover placement apparatus 16 is then set up to accept a new cell and recycle.

As previously stated, the second belt conveyor 28 starts on receipt of a signal from the post straightening apparatus 16, and runs until a new cell delivered from the first belt conveyor 26 is in position at the post straightening apparatus 14. The second belt conveyor 28 is also interlocked with the third belt conveyor 30 so that it will not run until the third belt conveyor 30 is ready to accept the cell being delivered from the post straightening apparatus 14. The third belt conveyor 30, as previously explained, will start on a signal from the cover placement apparatus 16 and will run until a new cell, delivered from the second belt conveyor 28, is in position at the cover placement apparatus 16. The third belt conveyor 30 is interlocked with the second belt conveyor 28 so that it will only run when the second belt conveyor 28 is running and will therefore accept a cell being delivered from the second belt conveyor 28.

The first roller accumulator 32 accepts cells from the third belt conveyor 30 and will run continually until it is fully loaded. A fully loaded condition is sensed pneumatically or electrically at a point adjacent the third belt conveyor 30. A signal from the sensor will also shut down the post straightening apparatus 14, the cover placement apparatus 16 as well as their associated conveyors. That portion of the system will remain shut down until the heat sealing apparatus 18 is accepting a new cell. A signal from the heat sealing apparatus 18 that it is accepting new cells will also start the first roller accumulator 32. The first roller accumulator 32 has a pinchstop mechanism 38 positioned at the end thereof which is adjacent the first roller conveyor 34. The pinchstop mechanism 38 operates under control of the heat sealing apparatus 18 and permits one cell at a time to be released from the first roller accumulator 32 onto the first roller conveyor 34 then onto the second roller conveyor 36 which transports the cell to the proper position in the heat sealing apparatus 18.

The heat sealing apparatus 18 clamps the cell in position, raises the cover from the top of the container, heats the top edge of the container and the bottom edge of the cover then replaces the cover on the container where, upon cooling, the cover is now sealed to the container. The second roller conveyor 36 then starts up and transports the cell to the third roller conveyor 38 which in turns transports the cell to the second roller accumulator 40. A second pinchstop apparatus 70 is located at the end of the second roller accumulator 40 adjacent the fourth belt conveyor 42. The second pinchstop apparatus 70 holds the cells on the second roller accumulator 40 until the flash removing apparatus 20 is ready to receive a new cell. The second roller accumulator 40 operates continuously until it is fully loaded, as sensed by a sensor located on the end of the second roller accumulator adjacent the third roller conveyor 38. A signal from this sensor will shut down all preceeding operations which will remain shut down until a signal is generated by the flash removing apparatus 20 that it is ready to accept new cells. The second pinchstop apparatus 70 releases the cells one at a time as they are required at the flash removing apparatus 20 as previously stated.

The fourth belt conveyor 42 operates in conjunction with the second pinchstop apparatus 70 also under control of the flash removing apparatus 20. As a result, as a cell is released by the second pinchstop apparatus 70 the fourth belt conveyor 42 transports the cell into a first position in the flash removing apparatus 20. When the cell is in the first position, a sensor, for example an electric sensor in the preferred embodiment, signals the flash removing apparatus that a cell is in place which in turn causes a guide clamp, for example a pneumatic type in the preferred embodiment, to energize and hold the cell in position. After a predetermined time delay, approximately three seconds in the preferred embodiment, to assure a proper clamp, the fourth belt conveyor 42 stops and a set of heat heated platens passes along the leading and trailing edges of the sealed cell, removing the excess flash along these edges. After a predetermined time delay, approximately eighteen seconds in the preferred embodiment to assure ample time for the movement of the heated platens, the guide clamp will release the cell, the fourth belt conveyor 42 will restart and transport the cell to the fifth belt conveyor 44. The fifth belt conveyor 44 transports the cell into a second position in the flash removing apparatus 20. At this time, the first position of the flash removing apparatus 20 is now set up to accept another cell and recycle.

When the cell arrives at the second position of the flash removing apparatus 20, a sensor, preferrably an electric sensor, provides a signal which energizes a second guide clamp, for example a pneumatic type in the preferred embodiment, to energize and hold the cell in position. After a predetermined time delay, approximately three seconds in the preferred embodiment, to assure proper clamping, a signal is given to stop the fifth belt conveyor 44 and begin driving a pair of heated platens along the front and rear edges of the sealed cell, removing any excess flash along these edges. After a predetermined time delay, approximately ten seconds in the preferred embodiment, a signal will be given to hold the heated platens in position off of the cell whereupon the pneumatic type guide clamp is released, and the fifth belt conveyor 44 is restarted, removing the cell from the machine and transporting it toward the third roller accumulator 46. As the cell clears the second position, as sensed by a sensor, preferably an electric sensor, the fifth belt conveyor 44 will stop for a predetermined length of time, approximately ten seconds in the preferred embodiment, in order to allow the heated platens to return to their home position, after which time the fifth belt conveyor 44 is again started and ready to transport a new cell into the second position and the previous cell onto the third roller accumulator 46.

A third pinchstop apparatus 72 located at the end of the roller accumulator 46 adjacent the sixth belt conveyor 48, holds the cells and releases them one at a time upon demand of the post welding apparatus 22. The third roller accumulator 46 will operate continuously until it is filled as indicated by sensor located at the end of the third roller accumulator 46 adjacent the fifth belt conveyor 44. A signal from this sensor will shut down all preceeding operations with the exception of the flash removing apparatus 20 which will be permitted to complete an in-process cycle. The systems will remain shut down until a signal is received from the post welding apparatus 22 that it is ready to accept new cells.

As previously stated, the third pinchstop apparatus 72 releases cells one at a time onto the sixth belt conveyor 48. The sixth belt conveyor 48 then transports the cell into position in the post welding machine 22. When the cell is in position, it is sensed, for example by an electrical sensor in the preferred embodiment, which in turn provides a signal, enabling a guide clamp, for example a pneumatic type in the preferred embodiment, to energize and hold the cell in position under cooling rings and firing nozzles of the post welding apparatus 22. After a predetermined time delay, approximately three seconds in the preferred embodiment to assure a proper clamp, the sixth belt conveyor 48 will stop and the operating head of the post welding apparatus 22 will move into position over the cell whereupon, after a predetermined time delay of approximately one second in the preferred embodiment, a cooling ring plate will drop over the post. When the cooling ring is in position, a signal is given to an RF beam welder to fire for a predetermined length of time, approximately eight seconds in the preferred embodiment. Approximately ten seconds after the signal was given to the RF beam welder to fire, the cooling ring plate will move up to its home position. Note that if the cooling ring does not come down into position over the posts within a predetermined amount of time, for example five seconds in the preferred embodiment, the post welding apparatus will shut down after the cooling ring plate reaches the home position, the head will return to its home position. After a predetermined time delay, approximately four seconds in the preferred embodiment, the guide clamp will release, the sixth belt conveyor 48 will restart and the cell will move out toward the fourth roller accumulator 50.

The fourth pinchstop apparatus 74 located at the end of the fourth roller accumulator 50 adjacent the 90° turn belt conveyor 52 releases cells one at a time onto the conveyor 52 under control of the cell test apparatus 24. The fourth roller accumulator 50 will run continuously until it is fully loaded, as sensed by a sensor positioned at the end of the fourth roller accumulator adjacent the sixth belt conveyor 48. At this time, the post welding apparatus 22, upon completing any inprocess cycle, will be shut down as will the sixth belt conveyor 48. When the cell test apparatus 24 is ready to receive cells again, it will send a signal to the post welding apparatus 22 and the sixth belt conveyor 48 to resume operation.

As previously stated, the fourth pinchstop apparatus 74 releases cells onto the 90° turn belt conveyor 52 one at a time. This conveyor 52 transports the cell to the seventh belt conveyor 54 which in turn transports the cell into position in the cell test apparatus 24. When the cell is in position at the cell test apparatus 24, it is sensed by a sensor, for example an electric or pneumatic sensor, which in turn causes the seventh belt conveyor 54 to stop and signals a plunger ram of the cell test apparatus 24 to move down into the fill hole of the cell. A limit switch, for example an electrical or pneumatic, senses when the plunger is in place and signals the cell test apparatus 24 to begin charging the cell with air and monitoring the pressure drop.

An air logic system reads the pressure drop and signals an air operated deflector 76 which is positioned over the wide belt conveyor 56, to remain in a home position (shown by dotted lines in FIG. 1) if the cell is good or to move to a shuttle position (shown by solid lines in FIG. 1) if the cell is bad. After the deflector 76 is placed in the correct position, a pneumatically operated stop will move away from the cell for a predetermined amount of time, for example five seconds in the preferred embodiment, the seventh belt conveyor 54 will restart transporting the cell to the wide belt conveyor 56 which in turn, under the guidance of the deflector 76, transports the cell to either the acceptance roller accumulator 58 for a good cell or the reject roller accumulator 60 for a bad cell. After the predetermined time delay has elapsed, the pneumatically operated stop will return to its home position ready to receive a new cell.

The good cells will be removed from the acceptance roller accumulator 58 and transported to other locations for additional processing as required. The bad cells will be removed by an operator from the reject roller accumulator 60 onto the first, second and third recycle roller conveyor 62, 64 and 66 for examination and repair if possible. If repair is possible, the repaired cell will be recycled back onto the fourth roller accumulator 50 for subsequent return to the cell test apparatus 24. If repair is not possible, the rejected cell will be removed from the recycle roller conveyors for subsequent salvage.

It will be understood that various changes in the details, materials and arrangements of parts which have been described and illustrated in order to explain the nature of this invention, may be made by those skilled in the art within the principle and scope of the invention as expressed in the following claims.

What is claimed is:

1. An apparatus for automatically covering and finishing an industrial lead-acid battery cell container having a cell group disposed therein, said group having at least two terminal posts extending therefrom, said apparatus comprising:
   a. means for automatically straightening said posts;
   b. means for automatically placing said cover on said container whereby each of said posts extends through an associated bushing disposed in said cover;
   c. means for automatically sealing said cover to said container;
   d. means for automatically removing flash from external surfaces of the cover to container seal;
   e. means for automatically welding said posts to said bushings;
   f. means for automatically testing for leaks in said cover to container seal and said post to bushing welds;
   g. means for automatically rejecting those cells having leaks which exceed a predetermined level; and
   h. means for automatically conveying said industrial lead-acid battery cell through said apparatus, wherein said conveying means is operatively associated with a plurality of stations capable of performing said automatic post straightening; said automatic cover placement; said automatic cover sealing; said automatic flash removing; said automatic post burning; and said automatic cell testing.

2. The invention in accordance with claim 1 conveying means comprises at least one conveyor and one accumulator disposed between adjacent operating stations.

3. The invention in accordance with claim 3 wherein said conveyor operates under the control of at least one of the adjacent operating stations.

4. The invention in accordance with claim 4 wherein said accumulator additionally comprises a pinchstop mechanism which releases said cell containers under the control of a subsequent operating station.

5. The invention in accordance with claim 5 wherein said accumulator additionally comprises means for providing a signal when said accumulator has accumulated a predetermined number of cell containers.

6. A method for automatically covering and finishing an industrial lead-acid battery cell container having a cell group disposed therein, said group having at least two terminal posts extending therefrom, said method comprising the steps of:
   a. automatically straightening said posts;
   b. automatically placing said cover on said container whereby each post extends through an associated bushing disposed in said cover;
   c. automatically sealing said cover to said container;
   d. automatically removing flash from external surfaces of the cover to container seal;
   e. automatically welding said posts to said bushings;
   f. automatically testing for leaks in said cover to container seal and said post to bushing welds;
   g. automatically rejecting those cells having leaks which exceed a predetermined level; and
   h. automatically conveying said container to and between a plurality of stations capable of performing said automatic post straightening, said automatic cover placement, said automatic cover sealing, said automatic flash removing, said automatic post welding, said automatic leak testing and said automatic cell rejecting.

7. An apparatus for automatically covering and finishing an industrial lead-acid battery cell container having a cell group disposed therein, said group having at least two terminal posts extending therefrom, said apparatus comprising:
   a. means for automatically straightening said posts including means for engaging said posts with a vertically movable ram and means for preventing movement of said container during the engagement of said posts with said ram;
   b. means for automatically placing a cover on said container, including means for maintaining said covers in spaced alignment with said container so that each of said posts extends through an associated bushing disposed in said cover;
c. means for automatically sealing said cover to said container;
d. means for automatically removing flash from external surfaces of the cover to container seal including at least one platen, and means for drawing said platen along said cover to container seal to remove said flash;
e. means for automatically welding said posts to said bushings including cooling means adapted for placement over said post and said bushing, and RF welding means directed onto said post and said bushing;
f. means for automatically testing for leaks in said cover to container seal and said post to bushing welds;
g. means for automatically rejecting those cells having leaks which exceed a predetermined level; and
h. means for automatically conveying said industrial lead-acid battery cell through said apparatus, wherein said conveying means is operatively associated with a plurality of stations capable of performing said automatic post straightening; said automatic cover placement; said automatic cover sealing; said automatic flash removing; said automatic post burning; and said automatic cell testing.

8. A method for automatically covering and finishing an industrial lead-acid battery cell container having a cell group disposed therein, said group having at least two terminal posts extending therefrom, said method comprising the steps of:
a. automatically straightening said posts by engaging said posts with a vertically movable ram while preventing movement of said container during said engagement of said posts with said ram;
b. automatically placing a cover on said container after maintaining said cover in spaced alignment with said container so that each of said posts extend through an associated bushing disposed in said cover;
c. automatically sealing said cover to said container;
d. automatically removing flash from external surfaces of the cover to container seal by drawing at least one platen along said cover to container seal;
e. automatically welding said posts to said bushings by directing RF welding means onto said posts and said bushings after placing cooling means around said posts and said bushings;
f. automatically testing for leaks in said cover to container seal and said post to bushing welds;
g. automatically rejecting those cells having leaks which exceed a predetermined level; and
h. automatically conveying said container to and between a plurality of stations capable of performing said automatic post straightening, said automatic cover placement, said automatic cover sealing, said automatic flash removing, said automatic post welding, said automatic leak testing and said automatic cell rejecting.

9. The invention in accordance with claim 1 wherein said post straightening means comprises a vertically movable ram capable of engaging said posts and means for preventing movement of said container during the engagement of said posts with said ram.

10. The invention in accordance with claim 10 wherein said post straightening means further comprises means for releasing said posts from said ram when said ram is withdrawn from said posts.

11. The invention in accordance with claim 1 wherein said cover placing means includes means for aligning said covers with respect to said containers so that each of said posts is aligned with its associated cover bushing.

12. The invention in accordance with claim 1 wherein said flash removing means comprises at least one movable platen, and means for drawing said platen along said cover to container seal to remove said flash.

13. The invention in accordance with claim 1 wherein said post welding means comprises cooling means adapted for placement over said post and said bushing, and RF welding means directed onto said post and said bushing over which said cooling means has been placed.

14. The method of claim 7 wherein said post straightening comprises engaging said posts with a vertically movable ram while preventing movement of said container during said engagement.

15. The method of claim 15 wherein said post straightening further include positively releasing said straightened posts from said ram.

16. The method of claim 7 wherein said cover placing is preceeded by maintaining said covers in aligned spaced relation to said containers.

17. The method of claim 7 wherein said flash removing includes drawing at least one platen along said cover to container seal.

18. The method of claim 7 wherein said post welding includes placing cooling means around said posts and bushings to be welded, and directing RF welding means onto said posts and bushings to be welded.

* * * * *